Jan. 9, 1923.  
W. M. DAVIS.  
SAW SET.  
FILED OCT. 31, 1921.  
1,441,968.  
3 SHEETS—SHEET 2.

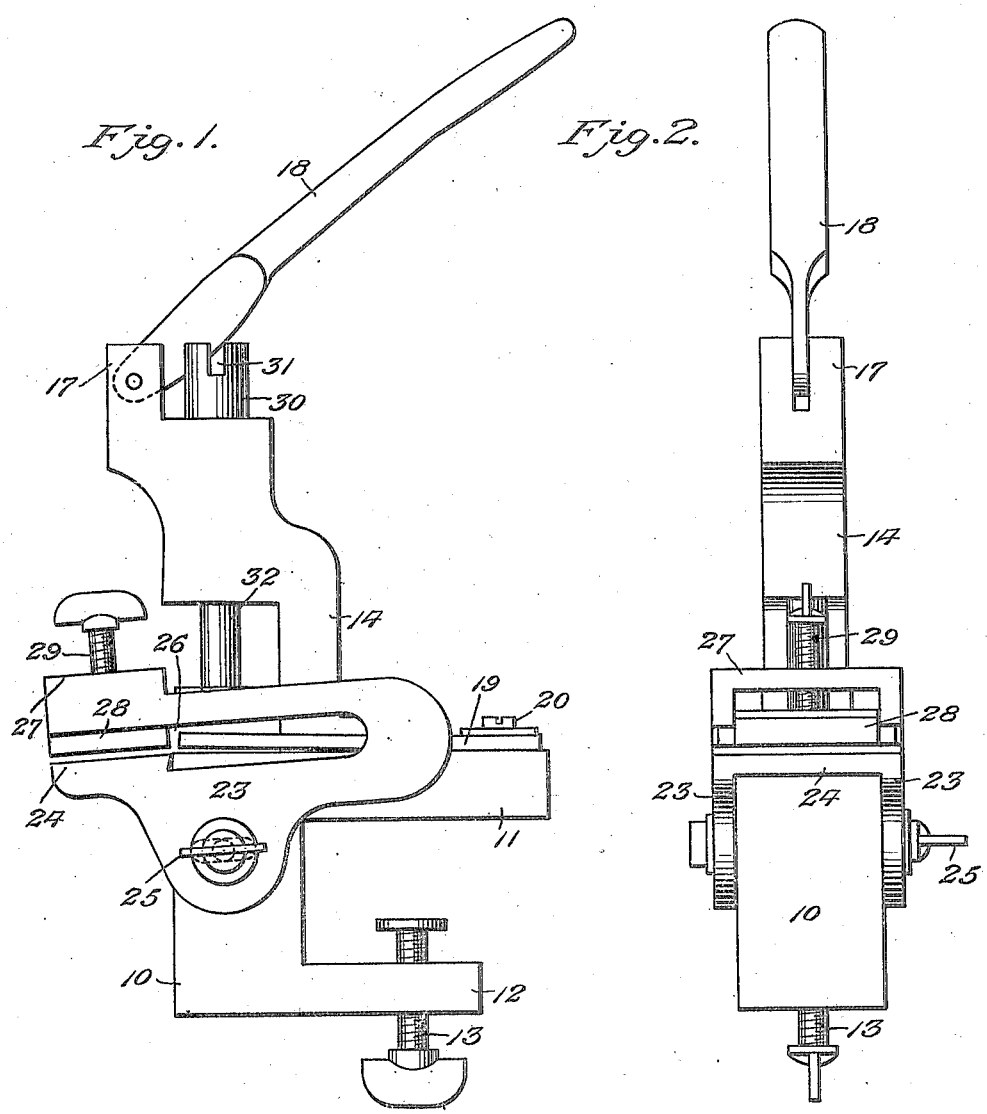

WITNESS: Edwin G. McKee

W. M. Davis INVENTOR  
BY Victor J. Evans ATTORNEY

Jan. 9, 1923.

W. M. DAVIS.
SAW SET.
FILED OCT. 31, 1921.

1,441,968.

3 SHEETS—SHEET 3.

W. M. Davis
INVENTOR

BY Victor J. Evans
ATTORNEY

WITNESS:
Edwin F. McKee

Patented Jan. 9, 1923.

1,441,968

UNITED STATES PATENT OFFICE.

WILLARD M. DAVIS, OF WAYNESVILLE, ILLINOIS.

SAW SET.

Application filed October 31, 1921. Serial No. 511,921.

*To all whom it may concern:*

Be it known that I, WILLARD M. DAVIS, a citizen of the United States, residing at Waynesville, in the county of De Witt and State of Illinois, have invented new and useful Improvements in Saw Sets, of which the following is a specification.

This invention relates to saw setting devices and has for its object the provision of a novel device whereby saw teeth of any length or width may be set at any desired angle in a very simple and expeditious manner.

An important and more specific object is the provision of a device of this character which includes a stationary support adapted to be clamped upon a table, shelf, or other suitable device and upon which is mounted a pivotally adjustable clamp adapted to engage and hold the blade of the saw to be set, the pivoted clamp cooperating with an anvil member onto which the saw teeth are forced and consequently set at the desired angle by means of a movable plunger.

Another object is the provision of a device of this character in which the anvil member is adjustable whereby teeth of different lengths may be set.

A still further object is the provision of a device of this character equipped with a plunger carrying teeth engaging members of different widths whereby teeth of different width may be set, the plunger member being freely adjustable.

An additional object is the provision of a device of this character which will be simple and inexpensive in manufacture, highly efficient and rapid in use, durable in service, and a general improvement in the art.

Figure 4:
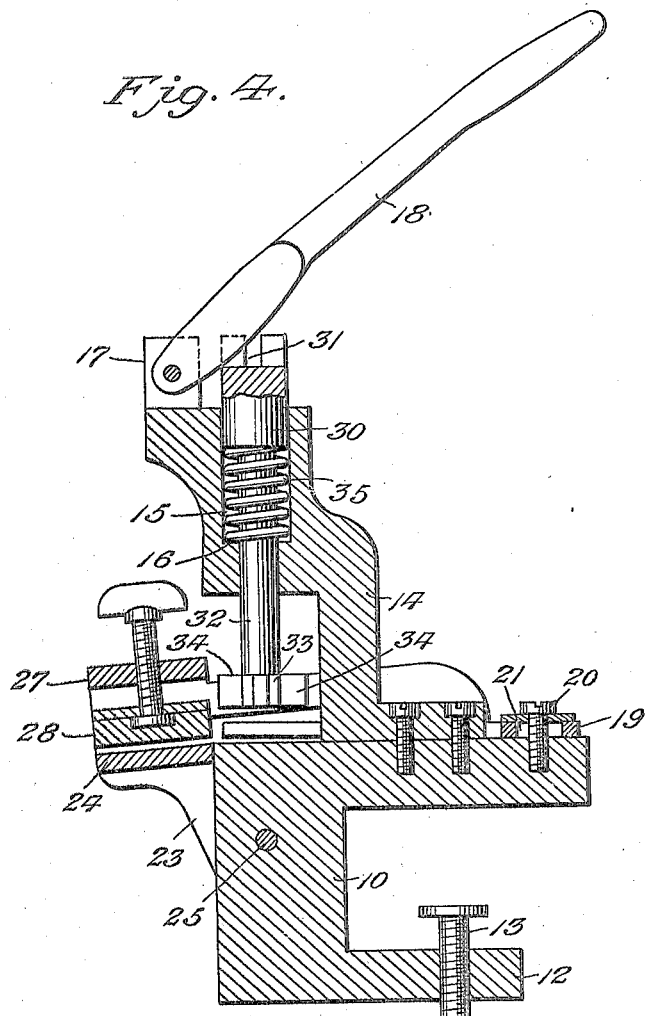
Figure 3:
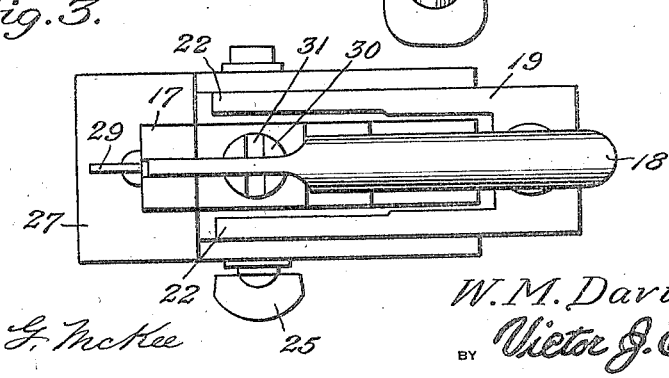
Figure 5:
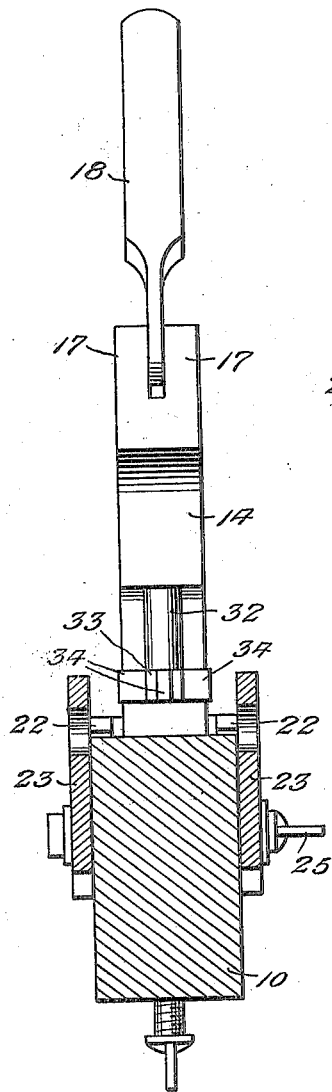
Figure 6:
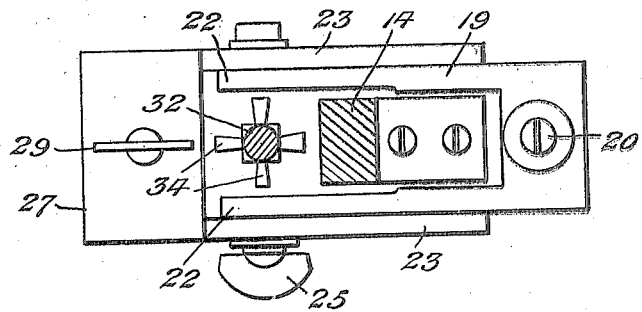
Figure 7:
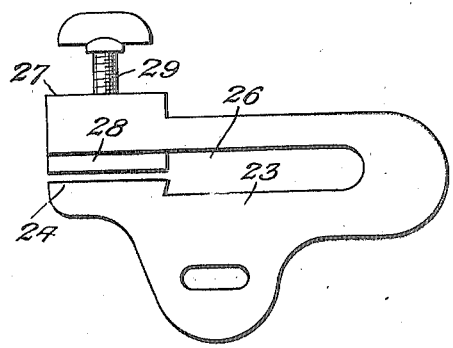

With the above and other objects and advantages in view, the invention consists in the details of construction to be hereinafter more fully described and claimed and illustrated in the accompanying drawings in which Figure 1 is a side elevation of my device showing the parts in one position, Figure 2 is a front elevation, Figure 3 is a top plan view, Figure 4 is a longitudinal sectional view, Figure 5 is a longitudinal sectional view at right angles to Figure 4, Figure 6 is a horizontal sectional view taken immediately above the saw blade clamp, and Figure 7 is a detail view of the saw clamp detached.

Referring more particularly to the drawings, I have shown my device as comprising a substantially U-shaped base 10 adapted to be engaged upon the edge of a table, bench, shelf, or other similar supporting member and including an upper arm 11 engaging upon the top of the support and further including a lower arm 12 provided with a swivel screw 13 whereby the device may be clamped against movement.

Rising from the top of the base is a standard 14 which is formed with a vertical bore 15 at the lower end of which is formed an inwardly extending flange 16 defining a stop shoulder. The upper end of the standard 14 is provided with spaced ears 17 between which is pivoted a lever 18.

Disposed upon the upper surface of the base and longitudinally adjustable thereon, is a U-shaped plate 19 having its arms straddling the standard 14 and held in place by a suitable screw 20 passing through a slot 21 and engaging within a hole in the base. The ends of the arms of the U-plate 19 are formed with extensions 22 upon which are adapted to be placed the blade of the saw to be set.

Associated with the base is a pivoted saw clamping device comprising side members 23 connected at their forward ends by a transverse bearing plate 24 and these side members are pivoted upon the base by a transverse clamping screw 25. These side members 23 are formed with elongated slots 26 so that they may receive a saw blade, the teeth of which are to be set. The side members are further connected by an upwardly offset plate member 27 which defines a species of rectangular socket within which is slidably engaged a clamping block 28 carried swivelly by the end of an adjusting screw 29, this block being movable into clamping engagement with a saw blade inserted within the slots 26 whereby to hold the saw blade rigid with respect to the members 23.

Slidable through the bore 15 of the standard 14 is a plunger including a relatively large upper portion 30 which is formed at its upper end with a plurality of notches 31 arranged in intersecting relation and which is formed at its lower end with a reduced stem 32 slidable within the flange 16 and carrying at its lower end a head 33 formed with a plurality of lugs 34 of different widths. A coil spring 35 is disposed within the bore 15 and engages against the flange 16 and the shoulder at the lower end of the large portion 30 of the plunger whereby to normally urge the plunger upwardly.

The operation of the device is as follows: The saw to be set is inserted through the slots 26 of the side frame members 23 with the base line of its teeth disposed in registration with the edge of the base 10 whereupon the screw 29 is tightened to bring the block 28 into engagement with the saw blade to clamp the latter upon the bearing plate 24. The U-plate 19 is adjusted upon the base to bring the ends of its arms at the proper location with respect to the base line of the teeth. The screw 25 is loosened and the side members 23 are moved so that the saw blade will be disposed at the proper angle so that when the teeth of the saw are moved onto the base they will have the proper inclination with respect to the plane of the blade, after which the clamping screw 25 is tightened to hold this adjustment. The lever 18 is then swung upwardly out of engagement with the plunger and the plunger is then rotated to bring the proper one of the lugs 34 in position above a tooth to be set, the proper lug of course depending upon the width of the tooth to be set. This having been effected the operator swings the lever 18 downwardly into engagement with the notch 31 aligning therewith and presses the lever downwardly with force whereupon the plunger will be moved downwardly and the proper lug 34 be brought into engagement with the tooth for forcing the latter flatly onto the base. The above described action is of course repeated for the alternate teeth to be set. One set of teeth being set the saw blade is reversed and the other alternate teeth are set in the opposite direction, as will be readily apparent.

From the foregoing description and a study of the drawings it will be obvious that I have thus provided a simple and consequently inexpensive device by means of which saw teeth of any length or width may be quickly and easily set at a uniform angle with very little effort and in a very short time, adjustment being provided to meet every contingency which might arise.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A device of the character described comprising a base adapted to be secured upon a support, a standard rising from said base, a lever pivoted upon said standard, a plunger slidable through said standard and engageable by said head, a saw tooth engaging lug on the lower end of said plunger, and a saw blade holding frame pivoted in straddling relation upon said base, said frame including end members formed with slots for the accommodation of the saw blade and further including a transverse bearing plate portion connecting the side members, and a clamping block disposed for cooperative relation with said bearing plate portion.

2. A device of the character described comprising a base adapted to be secured upon a support, a standard rising from said base, tiltable saw blade holding means carried by the base, a lever pivoted upon the standard, a plunger slidable through said standard and engageable by said lever, and a head on the lower end of the plunger formed with a plurality of radial lugs of varying widths, the plunger being rotatably adjustable whereby to bring a selected lug into engagement with a tooth to be set, the upper end of the plunger being formed with a plurality of intersecting notches corresponding to and aligning with said lugs.

3. A device of the character described comprising a base adapted to be clamped upon a support, a standard rising from said base, a saw holding frame pivoted upon said base in straddling relation thereto and adapted to be secured at a selected angular inclination, said frame being slotted for the reception of the saw blade and including a transverse bearing plate and a movable clamping block for gripping a saw blade, a spring-pressed plunger slidable through said standard, a lever pivoted upon the standard and engageable with the plunger, and a plurality of different sized saw tooth engaging lugs on the lower end of the plunger, the plunger being rotatably adjustable whereby to bring a selected lug into engagement with a tooth to be set.

In testimony whereof I affix my signature.

WILLARD M. DAVIS.